April 16, 1957 M. A. PROVI 2,788,963
WEIGHING SCALES
Filed Jan. 12, 1953 2 Sheets-Sheet 2
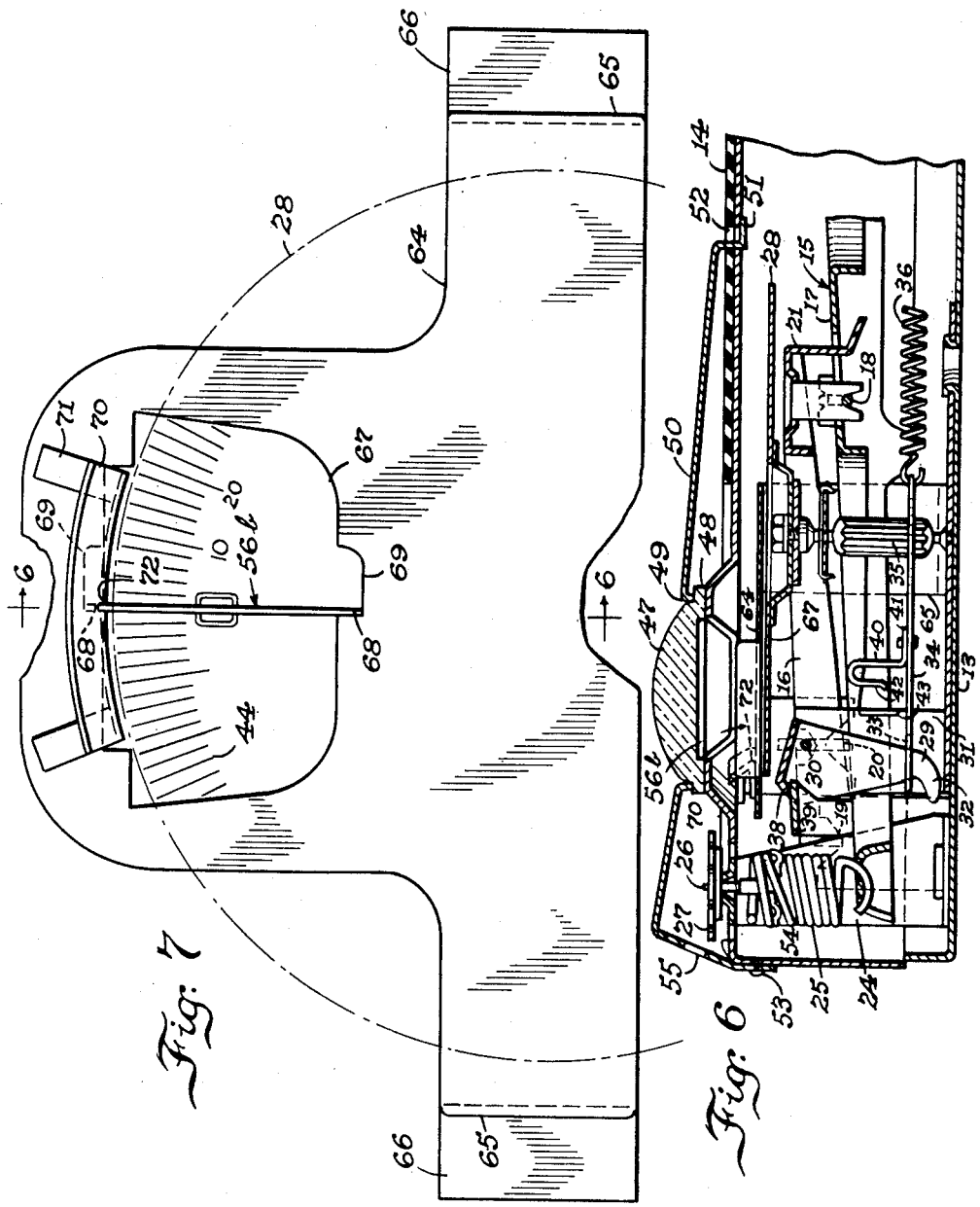
Inventor
Mike A. Provi
Andrew F. Wintercorn
Atty.

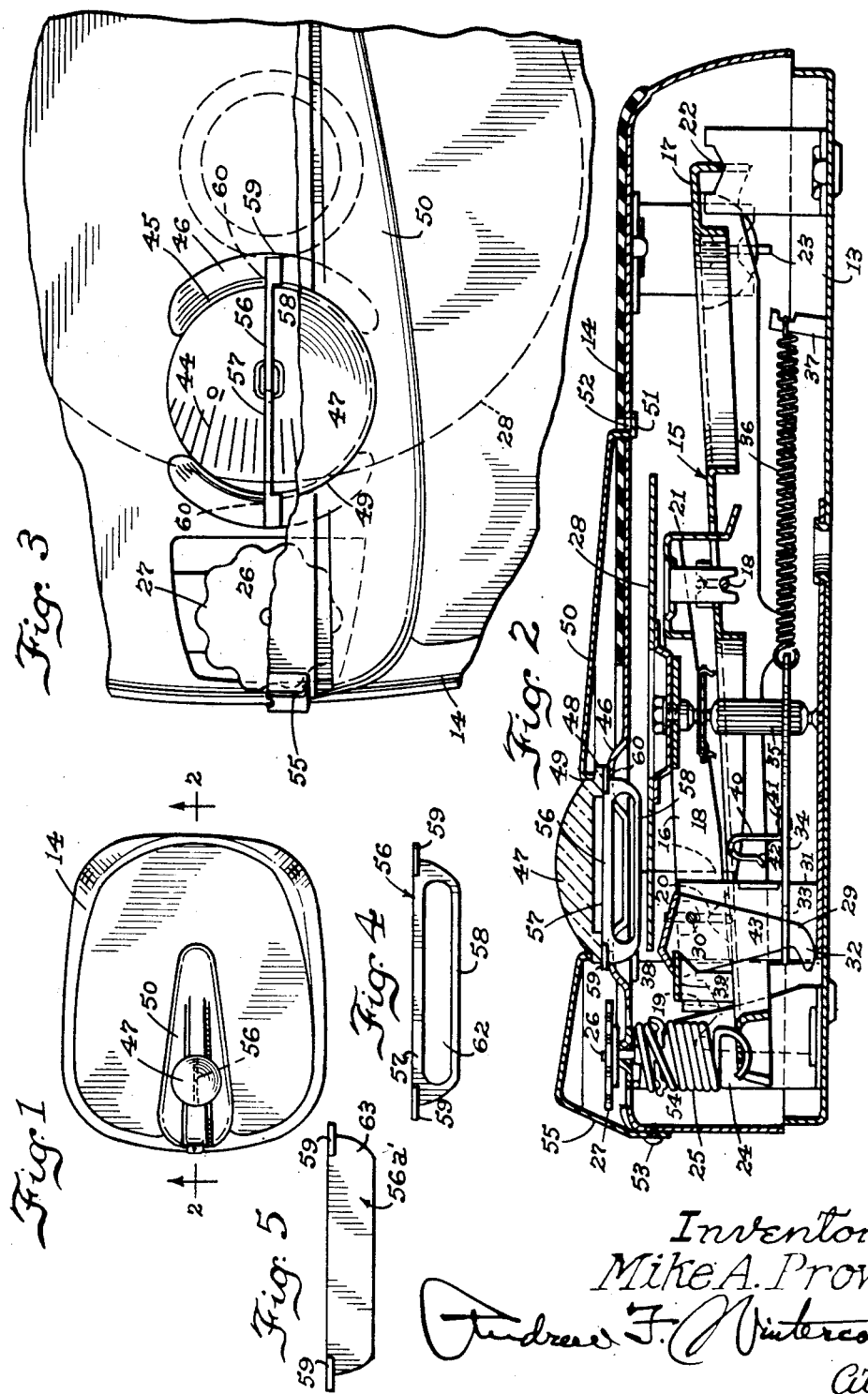

United States Patent Office 2,788,963
Patented Apr. 16, 1957

2,788,963
WEIGHING SCALES

Mike A. Provi, Rockford, Ill., assignor to The Brearley Company, Rockford, Ill., a corporation of Illinois Application January 12, 1953, Serial No. 330,824

9 Claims. (Cl. 265—68)

This invention relates to scales generally, and more particularly personal weighing scales, such as bathroom scales.

In bathroom scales of the popular flat top design a dial disk bearing the weight graduations is supported in the base to turn on a vertical axis relative to a window opening in the platform in which a magnification lens is provided to facilitate reading the indicated weight. In such scales the wire used as a hair line or index mark to indicate the weight is carried by the platform directly under the lens and is consequently spaced appreciably above the dial, making it difficult, even under the best conditions, as when automatic illumination is provided, to get an accurate reading. Much inaccuracy has been introduced into the readings as a result of sighting haphazardly at various angles on lines inclined to right or left of a true vertical line through the hairline. There was no means provided as a guide to insure sighting along a true vertical line; even the meticulous person aware of the necessity of sighting along such a line to obtain an accurate reading had no way of finding this line for certain and had to be content with an approximation. It is, therefore, the principal object of my invention to provide improved weight indicating means for bathroom scales, whereby the vertical line of sight with reference to the hairline for accuracy in reading is always assured.

In accordance with my invention the hairline wire is replaced by a double-hairline member providing an upper hairline at platform level closely beneath the lens and a lower hairline in spaced parallel relation to and in the same vertical plane with the upper line and as close as practicable to the dial, making proper allowance for the drop in elevation of the platform under weight, whereby to establish with the two lines the vertical plane in which the correct line of sight lies, so that correct readings may be taken. In a modification, the double-hairline member is in the form of a strip of sheet metal of appreciable width, equivalent to the spacing of the two lines, the similarly spaced upper and lower edge portions of the strip serving as the two lines. In another modification, the double hairline-member, of either of the two forms described, is fixedly supported on the scale base in closely spaced parallel relationship to the dial, the upper line thereof being approximately at platform level and spaced from the lens only enough to allow for the lowering of the platform under weight.

The invention is illustrated in the accompanying drawings, in which—

Fig. 1 is a plan view of a bathroom scale of otherwise conventional flat top design to which the improvements of my invention have been applied;

Fig. 2 is a longitudinal section in a vertical plane on the line 2—2 of Fig. 1, on a larger scale, the plane of the section being through the middle of the improved weight indicating means provided in accordance with my invention;

Fig. 3 is a fragmentary plan view of the front portion of the scale, still further enlarged, to better illustrate the weight indicating means, a portion of the escutcheon plate and magnification lens being broken away to show in plan view the stamped sheet metal hairline member that provides in one vertical plane two spaced parallel hairlines which together establish the vertical plane of the correct line of sight to be used in reading weight;

Fig. 4 is a side view of the hairline member removed;

Fig. 5 is a side view of a similar double-hairline member of slightly different construction;

Fig. 6 is a section like Fig. 2 but showing the double hairline member as a fixedly supported part carried by the base, this section being taken on line 6—6 of Fig. 7, and Fig. 7 is a plan view of the lower front portion of the scale below the platform.

Similar reference numerals are applied to corresponding parts throughout these views.

Referring first to Figs. 1 to 4, which illustrate one form of my invention, the flat top scale shown here has the same system of levers as illustrated in my copending application, Serial No. 733,582, filed March 10, 1947. The reference numeral 13 designates the generally rectangular sheet metal base on which a generally rectangular sheet metal platform 14 is supported by means of the lever system indicated generally by the reference numeral 15. This lever system includes a small U-shaped spider or wishbone lever 16 and a large generally triangular shaped spider or wishbone lever 17, the two levers being inter-connected by a hanger 18. The lever 16 is fulcrumed on the base 13 at the ends of the two arms 18 thereof, as indicated at 19, and these arms support the front end of the platform 14 intermediate their ends on hangers 20, the weight thus supported being transmitted by lever 16 to the middle of lever 17 through hanger 18. The latter cooperates with the cross-portion 21 of lever 16. Lever 17 is fulcrumed on the rear end of the base, as indicated at 22, and supports intermediate its ends the rear end portion of the platform 14 on hangers 23. The front end of lever 17 is suspended on a yoke 24 on the base 13 by means of a coiled tension spring 25. This spring has a screw 26 attached to its upper end on which an adjusting nut 27 is threaded to adjust the spring up or down relative to the yoke 24 so that the scale can be set back to zero if it should get out of adjustment. It is the downward deflection of the front end portion of lever 17 against the resistance of spring 25 under the load on platform 14 that causes rotation of the weight indicating dial or rotor 28. The dial operating means shown here is generally similar to that disclosed in Sutton Patent 2,232,830, issued February 25, 1941, and includes a bell-crank member 29 which oscillates on a horizontal axis and swings through an angle in proportion to the angle of deflection of the lever system 15.

The bell-crank lever 29 is pivoted on a cross-pin 30 supported at its ends in a yoke 31 mounted on the base 13. The lever 29 has a hooked lower end 31 entered in a slot 33 in the front end portion of an elongated rack 34 that is disposed horizontally in closely spaced relation to the base 13 and has connected with it one end of an elongated coiled tension spring 36 that is anchored at its other end to the base, as at 37. In that way lever 29 is kept under spring tension tending to move it in a counterclockwise direction about its pivot pin 30. Hence when lever 17 is depressed by weight on platform 14, lever 29 swings counterclockwise under spring tension and moves the rack 34 relative to the pinion 35 and turns the dial 28 to an extent in proportion to the downward deflection of lever 17. The lever 29 has a portion 38 bearing on top of a vertical V-shaped yoke 39 supported on the front end portion of lever 17 so that the lever 29 shifts its position accordingly as lever 17 moves. It is turned in a clockwise direction against the action of spring 36 upon upward movement of lever 17 and in a counterclockwise direction under action of spring 36 upon downward movement of lever 17. In other words, lever 29 in the weighing operation, in which the lever 17 moves downwardly, is operated resiliently, and, hence, if someone jumps on the scale platform 14, there is no likelihood of any destructive shocks and strains being transmitted to the dial mechanism. On the other hand, if a person gets off the scale suddenly and the rack 34 is accordingly pulled upward with sufficient violence in the sudden clockwise movement of lever 29 so that it tends to continue its forward movement when lever 29 stops, some further forward movement is permitted by the lost-motion connection afforded by slot 33, thereby relieving the dial mechanism of shocks and strains incident to sudden stoppage. If this unloading operation is unusually violent a cushioning action is afforded by a bowed leaf spring 40 that is mounted on the rack 34 by one end portion 41 and has its free end portion 42 arranged to strike a lug 43 provided on the yoke 31. In that way, the dial mechanism is further protected from shocks and strains, even though in the return movement of the lever system the lever 29 is positively returned.

The dial or disk 28 carries graduations 44 annularly of the top thereof, as shown in Fig. 3, and a window opening 45 is provided in a circular upwardly embossed portion 46 of the platform 14 over the front edge portion of the dial so that a reading may be taken of the indicated weight by a person standing on the platform. A magnification lens 47 gives sufficient enlargement so that the figures and graduation lines are easily seen from a higher level five or six feet above the platform. The lens 47 has a rim portion 48 resting on top of the embossed portion 46 of the platform, and fits in a circular hole 49 provided therefor in an escutcheon plate 50 that is suitably secured to the platform 14, as by means of a lug 51 on the rear end of the plate entered in a slot 52 in the platform, and a screw 53 entered through a hole in the front end of the plate and threaded in a registering hole 54 provided in the platform. A slot 55 in the front end of the plate 50 affords access to the rim portion of the nut 27 for setting the scale back to zero. Heretofore a wire was usually provided as a hairline extending diametrically relative to the flat bottom of the lens 47 on the longitudinal center line of the platform and suitably supported on the platform in a fixed relationship to the lens. However, as previously pointed out, the appreciable spacing of this hairline above the dial 28, plus the fact that one can read the indicated weight through lens 47 when sighting on a line inclined with respect to the vertical more or less to the right or to the left of a true vertical line, resulted in the introduction of considerable error in taking readings of indicated weight. If the line of sight was to the left of the vertical line the reading was higher, one, two, or more pounds, and vice versa if the reading was taken from the right of a true vertical line. I have, therefore, in accordance with the present invention, provided a double-hairline member 56 having one hair-line 57 at about the same level as heretofore, namely, immediately beneath the lens 47, and another hairline 58 in vertically spaced parallel relationship to and below hairline 57 in closely spaced parallel relationship to the top of dial 28, the two hairlines together establishing the true vertical plane in which the line of sight must lie for a correct reading. A person standing on the scale platform and looking down through lens 47 can tell immediately if his line of sight is not truly vertical because he will then see the other hairline 58 below the hairline 57 to the right or left depending on whether he is viewing to the right or left of the true vertical line. He then shifts his line of sight until he is on the true vertical line where he sees only the upper hairline 57. A reading of the indicated weight under such conditions is bound to be correct and there is no longer any guess-work about it. The lower hairline 58 is much closer to dial 28 when the platform is depressed under weight, thereby insuring even closer accuracy in readings. The double-hairline member 56 is in the form of a sheet metal stamping having lugs 59 bent into coplanar relationship at right angles to the vertical plane of the body of the member and so that the upper edge of the upper hairline 57 is flush with the top surfaces of the two lugs, as clearly appears in Fig. 4. Locating slots 60 are provided in the embossed portion 46 of the platform on diametrically opposite sides of the circular opening 45 to receive the opposite end portions of the double-hairline member 56 and mount it exactly on the longitudinal center line of the platform 14, the lugs 59 resting on top of the embossed portion 46 to support the double-hairline member on the platform. The rim 48 of the lenses 47 rests on top of the lugs 59 and, therefore, holds the double-hairline member 56 is place when the plate 50, which locates and fastens the lens in place, is secured in assembled relationship to the platform. The same results are obtainable, of course, if the double-hairline member 56 is provided as an integral punched and formed web portion in the embossed portion 46 of the platform 14.

The same results and advantages are obtained with the variation illustrated in Fig. 5, wherein the double-hairline member 56a is like the member 56 in all respects except that there is no opening 62 to define separate and distinct upper and lower hairlines 57 and 58, the sheet metal body 63 of member 56a being devoid of any opening. The lugs 59 on this member are the same as the lugs 59 on member 56 and are adapted to rest on top of the embossed portion 46 of the platform 14, notches 60 being provided on diametrically opposite sides of the opening 45 in the embossed portion to receive the opposite end portions of the hairline member and locate it accurately on the longitudinal center line of the platform.

Referring to Figs. 6 and 7, a further modification is illustrated in which the double-hairline member 56b, which, it will be understood, may be like either of the members 56 or 56a, is fixedly supported on the scale base 13 in closely spaced parallel relation to the top of the rotatable dial 28 by a bracket 64. The latter, as clearly appears in Fig. 7, has downwardly extending portions 65 on diametrically opposite sides of the dial 28 which terminate in outwardly bent feet portions 66 that rest on and are welded or otherwise suitably secured to the base 13. This bracket has a window opening 67 provided therein through which the graduations and numerals on the marginal portion of the dial 28 may be viewed, as indicated at 44 in Fig. 7, the lens 47, of course, serving to magnify the reading so that the person standing on the platform looking down through the lens 47 will have no difficulty reading his weight. The double-hairline member 56b in this instance, is a flat integral portion of the sheet metal bracket that is blanked out in the punching of the opening 67 and is thereafter bent upwardly at right angles to the horizontal plane of the bracket so as to determine a truly vertical plane in which the line of sight in reading weight must lie for accurate readings. The portion 68 forming the ends of the member 56b are struck from the body of the bracket 64 leaving notches 69, as appears in Fig. 7, on opposite sides of the window opening 67. The member 56b is, of course, disposed on the longitudinal center line of the platform 14, the same as the hairline members 56 and 56a. In this construction, the top edge of the hairline member 56b is disposed in spaced relation to the bottom of the lens 47, allowing just a little more than the necessary operating clearance so that when the platform 14 moves downwardly under weight, the lens will never engage the hairline member. An arcuate plate 70 disposed in concentric relation to dial 28 is disposed in inclined relation to the front of the window opening 67 and has supporting feet 71 on its opposite ends welded or otherwise suitably secured to the top of the bracket. The plate, especially if it is given a white enamel finish on the exposed face, will serve to reflect light originating outside the scale onto the dial 28 and thus help reading weight where the scale is not equipped with an electric light or where the battery for such a light happens to be used up. The plate 70, as indicated at 72, has a vertical slot in the middle thereof in which the front end 68 of the hairline member 56b is received, thereby helping to insure accurate location of the reflector plate 70 and at the same time support the member 56b against the likelihood of its getting bent out of the vertical plane in the handling of the brackets 64 at the factory prior to the assembling of these brackets in the scales and in the handling of the partially assembled scales with brackets 64 installed before the platforms 14 are applied.

The operation of this form is substantially the same as the other in so far as helping the person standing on the scale establish the true vertical line of sight in reading weight, so that correct readings will be taken. The close spacing of the double-hairline member 56b with respect to the dial 28 that is made possible with this construction, tends toward even closer accuracy in reading weight than where the double-hairline member is carried on the platform.

It is believed the foregoing description conveys a good understanding of the objects and advantages of my invention. The appended claims have been drawn to cover all legitimate modifications and adaptations.

I claim:

1. In a bathrom scale comprising a base, a platform supported in spaced relation to and over said base for up and down movement on a system of levers pivotally supported on the base, and weighing spring means resisting deflection of said levers under weight applied on the platform, the combination of a horizontal weight indicating disk rotatably mounted on the base below and spaced from said platform carrying graduations visible through a window opening provided in the platform, means operatively connecting said disk with said levers so as to turn the disk in proportion to weight applied on the platform, a magnification lens carried by and secured to said platform in said window opening, and an insert under and held in place on the platform by said lens, said insert providing two spaced substantially horizontal hairlines in a vertical plane between said disk and said lens on the longitudinal center-line of said platform, the upper one of said hairlines being close to and substantially parallel with the bottom of said lens and the lower one of said hairlines being close to and substantially parallel with the top of said weight indicating disk, so that the two hairlines are spaced substantially as far apart as the small space between the disk and lens will permit while leaving working clearance between the lower hairline and the disk, said hairlines cooperating to establish the plane of a truly vertical line of sight when viewed from above at the eye distance of a person standing on the platform, whereby to guide the person standing on the platform in sighting on a truly vertical line passing through said hairlines in reading a weight indicated on said disk.

2. A scale as set forth in claim 1 wherein said platform has an upwardly embossed portion in which the window opening is provided, whereby to enable elevating the upper hairline to that extent with respect to the rest of the platform and accordingly enable wider spacing of the two hairlines.

3. In a bathroom scale comprising a base, a platform supported in spaced relation to and over said base for up and down movement on a system of levers pivotally supported on the base, and weighing spring means resisting deflection of said levers under weight applied on the platform, the combination of a horizontal weight indicating disk rotatably mounted on the base below and spaced from said platform carrying graduations visible through a window opening provided in the platform, means operatively connecting said disk with said levers so as to turn the disk in proportion to weight applied on the platform, said platform having slots provided therein on diametrically opposite sides of said window opening located on the longitudinal center line of said platform, a flat elongated hairline member of appreciable width having its opposite ends entered in said slots to locate it diametrically of the opening on the longitudinal center line of the platform in a vertical plane, said member having lugs projecting at right angles from the end portions engaging the platform and supporting said member against downward displacement relative to said opening, the top and bottom edge portions of said member being appreciably spaced and cooperating to define a vertical plane to guide an observer standing on the platform in sighting on a truly vertical line in reading a weight indicated on said disk, a magnification lens in said opening resting on top of said lugs, and means for securing said lens and thereby said hairline member in place on said platform.

4. A scale as set forth in claim 3 wherein said platform has an upwardly embossed portion in which the window opening is provided, whereby to provide increased space between the disk and lens for the spaced hairlines so that they can be spaced farther than would otherwise be possible.

5. As an article of manufacture, a weight indicator hairline member for a bathroom scale, the same comprising an elongated generally rectangular body of sheet material of uniform small thickness, the opposed longitudinal edge portions of which are straight and appreciably spaced and substantially parallel and lie in a common plane, the opposite end portions of said body having lateral projections at right angles to the plane of the body for support of the member on a scale.

6. As an article of manufacture, a weight indicator hairline member for a bathroom scale, the same comprising an elongated generally rectangular body of sheet material of uniform small thickness, the opposed longitudinal edge portions of which are straight and appreciably spaced and substantially parallel and lie in a common plane, the opposite end portions of said body having lateral projections at right angles to the plane of the body for support of the member on a scale, the projections being in coplanar relation and substantially flush with one longitudinal edge of said body.

7. As an article of manufacture, a weight indicator hairline member for a bathroom scale, the same comprising an elongated generally rectangular body of sheet material of uniform small thickness, the opposed longitudinal edge portions of which are straight and appreciably spaced and substantially parallel and lie in a common plane, the opposite end portions of said body having lateral projections at right angles to the plane of the body for support of the member on a scale, said body having an elongated opening provided therein leaving only relatively narrow portions of uniform width on opposed longitudinal edges.

8. In a bathroom scale comprising a base, a platform supported in spaced relation to and over said base for up and down movement on a system of levers pivotally supported on the base, and weighing spring means resisting deflection of said levers under weight applied on the platform, the combination of a horizontal weight indicating disk rotatably mounted on the base below and spaced from said platform carrying graduations visible through a window opening provided in the platform, means operatively connecting said disk with said levers so as to turn the disk in proportion to weight applied on the platform, a bracket mounted on said base having a portion overlying a portion of the weight indicating disk in closely spaced parallel relationship thereto in which a window opening is provided in register with the window opening in the platform, and an elongated generally rectangular weight indicator body of sheet material of uniform small thickness supported on said bracket in a vertical plane in the middle of the window opening therein, the opposed longitudinal edge portions of said weight indicator body being straight and appreciably spaced and substantially parallel and lying in a common plane, said opposed longitudinal edge portions defining hairlines as far apart as the small space between the bracket and window opening in the platform will permit while leaving working clearance between the weight indicator body and the platform, said hairlines serving to cooperate to establish the plane of a truly vertical line of sight when viewed from above at the eye distance of a person standing on the platform, whereby to guide the person standing on the platform in sighting on a truly vertical line passing through said hairlines in reading a weight indicated on said disk.

9. A scale as set forth in claim 8, wherein said bracket is of sheet metal construction and said weight indicator body is an integral portion of said bracket bent upwardly at right angles to the portion thereof in which the window opening is provided.

References Cited in the file of this patent

UNITED STATES PATENTS

| | | |
|---|---|---|
| 299,369 | Fitch | May 27, 1884 |
| 425,383 | Mink | Apr. 8, 1890 |
| 946,289 | Triner | Jan. 11, 1910 |
| 1,153,098 | Miller | Sept. 7, 1915 |
| 2,232,830 | Sutton | Feb. 25, 1941 |
| 2,331,642 | Weber | Oct. 12, 1943 |
| 2,432,006 | Haferl | Dec. 2, 1947 |
| 2,446,332 | Juhasz | Aug. 3, 1948 |
| 2,563,723 | Hart | Aug. 7, 1951 |
| 2,610,051 | Terraillon | Sept. 9, 1952 |
| 2,610,844 | Hallwood | Sept. 16, 1952 |

FOREIGN PATENTS

| | | |
|---|---|---|
| 289,112 | Switzerland | June 16, 1953 |